United States Patent
Wang et al.

(10) Patent No.: US 11,818,491 B2
(45) Date of Patent: Nov. 14, 2023

(54) IMAGE SPECIAL EFFECT CONFIGURATION METHOD, IMAGE RECOGNITION METHOD, APPARATUS AND ELECTRONIC DEVICE

(71) Applicant: Beijing Bytedance Network Technology Co., Ltd., Beijing (CN)

(72) Inventors: Yujia Wang, Beijing (CN); Le Gao, Beijing (CN); Gao Liu, Beijing (CN); Haozhe Li, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/054,061

(22) Filed: Nov. 9, 2022

(65) Prior Publication Data

US 2023/0112005 A1 Apr. 13, 2023

Related U.S. Application Data

(63) Continuation of application No. PCT/CN2021/092171, filed on May 7, 2021.

(30) Foreign Application Priority Data

May 9, 2020 (CN) .......................... 202010388454.6

(51) Int. Cl.
*H04N 5/262* (2006.01)

(52) U.S. Cl.
CPC ................................. *H04N 5/2621* (2013.01)

(58) Field of Classification Search
CPC .... H04N 5/2621; H04N 23/70; H04N 23/741; H04N 5/265; H04N 23/63; G06T 11/60;
(Continued)

(56) References Cited

U.S. PATENT DOCUMENTS

| 2004/0076400 A1 | 4/2004 | Kawate et al. |
| 2016/0239158 A1 | 8/2016 | Zhang et al. |

(Continued)

FOREIGN PATENT DOCUMENTS

| CN | 102509313 A | 6/2012 |
| CN | 104902212 A | 9/2015 |

(Continued)

OTHER PUBLICATIONS

International Search Report and Written Opinion in PCT/CN2021/092171, dated Aug. 11, 2021, 18 pages.

(Continued)

*Primary Examiner* — Congvan Tran
(74) *Attorney, Agent, or Firm* — ARENTFOX SCHIFF LLP

(57) ABSTRACT

The present disclosure provides an image special effect configuration method, an image recognition method and apparatus, which relate to the field of information processing technology. The image special effect configuration method includes: acquiring an image element; acquiring a target multimedia resource corresponding to the image element in response to a special effect configuration operation for the image element; storing the image element and the target multimedia resource into a special effect configuration file in an association way; the special effect configuration file being used for performing special effect configuration on an original image, so that the target multimedia resource is played in a case where the image element appears in the original image.

17 Claims, 2 Drawing Sheets

(58) Field of Classification Search
CPC ..... G06T 11/00; G06T 2200/24; G06V 40/16; G06F 3/04847; G06F 3/04845; G06F 3/04842
See application file for complete search history.

(56) References Cited

U.S. PATENT DOCUMENTS

| | | | |
|---|---|---|---|
| 2017/0280064 A1* | 9/2017 | Wei | H04N 23/70 |
| 2021/0029305 A1 | 1/2021 | Tang et al. | |
| 2021/0287431 A1* | 9/2021 | Woop | G06T 3/4007 |
| 2021/0366163 A1* | 11/2021 | Lin | G06V 40/16 |

FOREIGN PATENT DOCUMENTS

| | | |
|---|---|---|
| CN | 107592474 A | 1/2018 |
| CN | 108174099 A | 6/2018 |
| CN | 109618183 A | 4/2019 |

OTHER PUBLICATIONS

Extended European Search Report in EP21803144.1, dated Aug. 29, 2023, 8 pages.

* cited by examiner

IMAGE SPECIAL EFFECT CONFIGURATION METHOD, IMAGE RECOGNITION METHOD, APPARATUS AND ELECTRONIC DEVICE

The present application is a continuation of International Patent Application No. PCT/CN2021/092171, filed on May 7, 2021, which claims priority of Chinese Patent Application No. 202010388454.6, filed on May 9, 2020, and the entire content disclosed by the Chinese patent application is incorporated herein by reference as part of the present application.

TECHNICAL FIELD

The present disclosure relates to the field of information processing technology, and more particularly, to an image special effect configuration method, an image recognition method, apparatus and electronic device.

BACKGROUND

With the development of computer technology and mobile communication technology, intelligent terminals have been widely used. Users can use intelligent terminals to acquire various information, take photos or videos to share with friends on social platforms, etc. In order to enrich a play effect of an image or a video, various special effects are usually added to the image or the video.

In prior arts, some application programs trigger corresponding special effects by recognizing specific image elements, such as facial expressions or gestures.

SUMMARY

In the first aspect, an image special effect configuration method is provided, which comprises:
 acquiring an image element;
 acquiring a target multimedia resource corresponding to the image element in response to a special effect configuration operation for the image element; and
 storing the image element and the target multimedia resource into a special effect configuration file in an association way.

The special effect configuration file is used for performing special effect configuration on an original image, so that the target multimedia resource is played in a case where the image element appears in the original image.

In the second aspect, an image recognition method is provided, which comprises:
 performing recognition processing on an original image in response to an image recognition trigger operation; and
 acquiring and playing a target multimedia resource corresponding to an image element in a case where the image element is recognized in the original image.

The target multimedia resource is configured by using the image special effect configuration method shown as the first aspect of the present disclosure.

In the third aspect, an image special effect configuration apparatus is provided, which comprises:
 a first acquisition module, configured to acquire an image element;
 a first reception module, configured to acquire a target multimedia resource corresponding to the image element in response to a special effect configuration operation for the image element; and
 a first association module, configured to store the image element and the target multimedia resource into a special effect configuration file in an association way.

The special effect configuration file is used for performing special effect configuration on an original image, so that the target multimedia resource is played in a case where the image element appears in the original image.

In the fourth aspect, an image recognition apparatus is provided, which comprises:
 a recognition module, configured to perform recognition processing on an original image in response to an image recognition trigger operation; and
 a play module, configured to acquire and play a target multimedia resource corresponding to an image element in a case where the image element is recognized in the original image.

The target multimedia resource is configured by using the image special effect configuration method shown as the first aspect of the present disclosure.

In the fifth aspect, an electronic device is provided, which comprises:
 one or more processors;
 a memory; and
 one or more computer programs, wherein the one or more computer programs are stored in the memory and configured to be executed by the one or more processors, and the one or more computer programs are configured to: perform the operations corresponding to the image special effect configuration method shown as the first aspect of the present disclosure or the image recognition method shown as the second aspect of present disclosure.

In the sixth aspect, a computer-readable medium is provided, the computer-readable medium is used for storing computer instructions that, when executed on a computer, causes the computer to execute the image special effect configuration method shown as the first aspect of the present disclosure or the image recognition method shown as the second aspect of present disclosure.

BRIEF DESCRIPTION OF THE DRAWINGS

In order to more clearly explain the technical solutions in the embodiments of the present disclosure, the accompanying drawings required to be used in the description of the embodiments of the present disclosure will be briefly introduced below.

DETAILED DESCRIPTION

Figure 1:
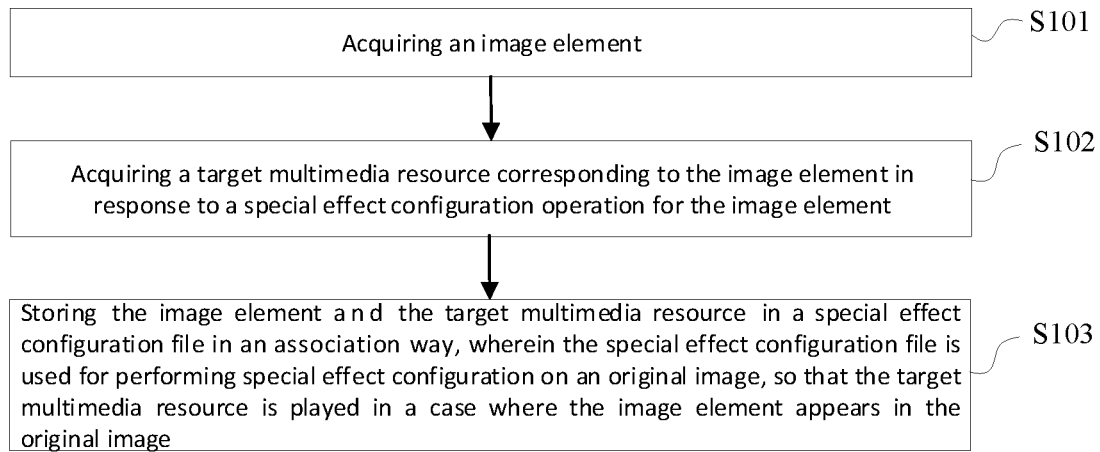
FIG. 1 is a flowchart of an image special effect configuration method provided by an embodiment of the present disclosure.

Embodiments of the present disclosure will be described in more detail below with reference to the accompanying drawings. Although certain embodiments of the present disclosure are shown in the accompanying drawings, it should be understood that the present disclosure can be implemented in various forms, and should not be interpreted as limited to the embodiments set forth herein. Instead, these embodiments are provided for a more thorough and complete understanding of the present disclosure. It should be understood that the accompanying drawings and the embodiments of the present disclosure are only for illustrative purposes, and are not intended to limit the protection scope of the present disclosure.

It should be understood that various steps described in method implementations of the present disclosure may be executed in different order and/or in parallel. Furthermore, the method implementations may comprise additional steps and/or omit execution of the steps shown. The scope of the present disclosure will not be limited in this regard.

The term "comprising" and its variants used herein are open comprising, that is, "comprising but not limited to". The term "based on" is "at least partially based on". The term "one embodiment" means "at least one embodiment". The term "another embodiment" means "at least one other embodiment". The term "some embodiments" means "at least some embodiments". Relevant definitions of other terms will be given in the following description.

It should be noted that concepts such as "first", "second" and the like as mentioned in the present disclosure are only used to distinguish apparatus, module or unit, but not to define that these apparatuses, modules or units must be different apparatuses, modules or units, nor to define the order or interdependence of the functions executed by these apparatuses, modules or units.

It should be noted that the modification of "one" and "a plurality of" as mentioned in the present disclosure are exemplary rather than restrictive. Those skilled in the art should understand that, unless otherwise explicitly specified in the context, it should be understood as "one or more".

The names of messages or information interacted between a plurality of apparatuses according to the implementations of the present disclosure are only used for illustrative purposes, and are not used to limit the scope of these messages or information.

In general, a special effect configuration way requires a developer to develop a specific image recognition algorithm for the specific image element, which is not convenient for a special effect designer.

To this end, the present disclosure provides an image special effect configuration method, an image recognition method, apparatus and electronic device, which are used to solve problems in the prior art.

The beneficial effects of the technical solution provided by the present disclosure are:

In the image special effect configuration method, the image recognition method, and the apparatus provided by embodiments of the present disclosure, an image element is acquired; a target multimedia resource corresponding to the image element is acquired in response to a special effect configuration operation for the image element; the image element and the target multimedia resource are stored into a special effect configuration file in an association way; wherein, the special effect configuration file is used for performing special effect configuration on an original image, so that the target multimedia resource is played in a case where the image element appears in the original image. In the present disclosure, a user may customize the image element, and sets the corresponding target multimedia resource. The corresponding target multimedia resource is played in a case where the image element is recognized, so that the configuration of the image special effect is more flexible.

The technical solution of the present disclosure and how the technical solution of the present disclosure solves the above technical problems are described in detail below with specific embodiments. The following specific embodiments can be combined with each other, and the same or similar concepts or processes may not be repeated in certain embodiments. The embodiments of the present disclosure will be described below in combination with the accompanying drawings.

The image special effect configuration method of the present disclosure can be specifically a visual image special effect configuration tool. Based on this method, a designer of an image special effect configuration file can generate an image special effect configuration file through the image special effect configuration tool, and the image special effect configuration file can configure the corresponding target multimedia resource for the image element in the original image. When the user recognizes the image element through a terminal device, the pre-configured target multimedia resource is played.

FIG. 1 is a flowchart of an image special effect configuration method provided by an embodiment of the present disclosure; as shown in FIG. 1, the method may comprise:

Step S101: acquiring an image element.

An execution subject of the present disclosure can be a terminal device, such as a computer, a mobile phone, etc. The image element can be an element in any image in an original image selected by the user (the designer of an image special effect configuration file), which may specifically comprise images in some or all regions of the original image. For example, the original image is an image that comprises a person, in which the person can be used as an image element.

A specific method of acquiring the image element may comprise: directly receiving the image element imported by the user, or receiving the original image imported by the user, and determining an image element according to a region selected by the user for the original image. After the image element is acquired, the image element can be shown to the user, which is convenient for the user to configure a corresponding target multimedia resource based on the shown image element.

Step S102: acquiring a target multimedia resource corresponding to the image element in response to a special effect configuration operation for the image element.

For example, in some examples, the special effect configuration operation for the image element is executed by the user. After the image element is acquired, the target multimedia resource corresponding to the image element is configured through the special effect configuration operation. The target multimedia resource is a file that is triggered to be played after the image element is recognized.

The content of the target multimedia resource may or may not be related to the content of the image element, and the target multimedia resource may have multiple formats, which is not limited in the present disclosure.

In addition, the target multimedia resource can be one or at least two files. If the target multimedia resource is the at least two files, the operation can be set according to the play order of the user to determine the play order of at least two target multimedia resources corresponding to the image element. After the image element is recognized, each target multimedia resource can be played in sequence according to the play order.

Step S103: storing the image element and the target multimedia resource into the special effect configuration file in an association way.

The special effect configuration file is used for performing the special effect configuration on the original image, so that the target multimedia resource is played in a case where the image element appears in the original image.

After the target multimedia resource corresponding to the image element in the original image is configured, an association relationship is established between the image element and the corresponding target multimedia resource, the image element and the corresponding target multimedia resource are stored into the image special effect configuration file in an association way. When the user recognizes the image element in the original image through the terminal device, the target multimedia resource stored in association with the image element is played.

For a specific acquisition method of the target multimedia resource in the present disclosure, see the following embodiments.

The target multimedia resource in the technical solution of the present disclosure can be directly called from a database.

In a possible implementation, acquiring the target multimedia resource corresponding to the image element comprises:

showing a multimedia resource list in response to a trigger operation on the multimedia resource list; and taking a selected multimedia resource as the target multimedia resource in response to a selection operation for a multimedia resource in the multimedia resource list.

In practical applications, at least one selected from a group consisting of a picture, video and audio can be directly selected from the multimedia resource list in the database according to the selection operation of the user to serve as the target multimedia resource, and the target multimedia resource can be directly called, which is more convenient to use.

For example, in some examples, the trigger operation for the multimedia resource list and the selection operation for the multimedia resource in the multimedia resource list are executed by the user.

In a possible implementation, the method further comprises:

acquiring a display region of the image element;

determining a display region of the target multimedia resource based on the display region of the image element; and storing the display region of the target multimedia resource and the target multimedia resource into the special effect configuration file in an association way.

In practical applications, the display region of the target multimedia resource can be determined based on the display region of the image element. For example, the target multimedia resource may comprise the video of the multi-frame images. When the image element imported by the user is received, display region information of the image element is acquired, which comprises a display position and size of the image element in the current interface. After the user imports each frame image of the video, the display position of each frame image can be determined based on the display position of the image element and the position change amount between the image element and each frame image. The position change amount between the image element and each frame image is determined based on the received operation of the user. The size of each frame image is determined based on the size of the image element, the display region of each frame image is determined based on the display position and size of each frame image, and the display region of each frame image and the video are stored into the special effect configuration file in an association way.

In the present disclosure, the display region of the target multimedia resource is determined based on the display region of the image element, so that there is an association relationship between the image element and the multimedia resource in terms of position and size. When the image element is recognized, the video is played according to the display region stored in the special effect configuration file, which presents a change effect from a static image to a dynamic video.

In one example, the image element is a person image, the target multimedia resource is a video, and the video shows a dynamic person image. The display position of each frame image is determined according to the display position of the person image. The size of each frame image is determined according to the size of the person image, and the display position and size of each frame image and the video are stored into the display effect configuration file in an association way. When the video is played, a static person can be presented in the original display position, and the dynamic change effect can be presented in a same size.

How to play the target multimedia resource in the present disclosure can also be set according to the user-defined mode. For details, see the following embodiment.

In a possible implementation, the method further comprises:

in response to a play setting operation for the multimedia resource, determining play information corresponding to the target multimedia resource based on the play setting operation;

storing the play information and the target multimedia resource into the special effect configuration file in an association way.

The play information comprises at least one selected from a group consisting of: loop play, play duration, and play times.

For example, in some examples, the play setting operation for the multimedia resource is executed by the user.

In practical applications, the play information of the multimedia resource can be determined according to the play setting operation of the user. The multimedia resource can be loop-played repeatedly, or can be played according to the play duration set by the user. The multimedia resource can also be played for corresponding times according to the play times set by the user, and the play information and the multimedia resource are stored into the special effect configuration file in an association way. The target multimedia resource corresponding to the image element is configured by using the image special effect configuration file in the present disclosure. When the image element is recognized to trigger video play, the multimedia resource can be played according to the play setting operation of the user, so that the multimedia resource is played more flexibly to meet different needs of users.

In the present disclosure, in addition to directly receiving the target multimedia resource selected by the user, the target multimedia resource can also be generated. For details, see the following embodiment.

In a possible implementation, acquiring the target multimedia resource corresponding to the image element comprises:

generating the corresponding target multimedia resource based on the image element.

In practical applications, the corresponding target multimedia resource can be generated based on the content of the image element. The content of the target multimedia resource comprises the content of the image element. Contents can be added, deleted and modified on the basis of the image element to obtain the target multimedia resource corresponding to the image element. In the present disclosure, the target multimedia resource can be generated based on the image element. The content of the target multimedia resource is related to that of the image element. The target multimedia resource is configured by using the image special effect configuration file in the present disclosure, which can meet the user's need for triggering to play the target multimedia resource related to the content after the image element is recognized.

The target multimedia resource generated based on the image element may have multiple forms. For details, see the following embodiment.

In a possible implementation, generating the target multimedia resource based on the image element comprises:

acquiring special effect elements, adding the special effect elements to the image element, and generating the target multimedia resource.

The special effect elements comprise at least one selected from a group consisting of: text, image, makeup, filter and audio.

In practical applications, the special effect elements can be acquired, and the special effect elements are added to the image element to generate the target multimedia resource. Optionally, the user's selection operation of the special effect element list is received, and the special effect element list is displayed. When the user's selection operation for the special effect elements in the special effect element list is received, the selected special effect elements are added to the image element to generate the target multimedia resource corresponding to the image element. The target multimedia resource is configured by using the image special effect configuration file in the present disclosure, and when the image element is recognized, the target multimedia resource comprising the special effect elements can be triggered.

The special effect elements may comprise at least one selected from a group consisting of: text, dynamic or static image, makeup, filter, audio, etc. The special effect elements can be acquired from a local special effect element library or a cloud special effect element library. The text and the image, etc. can be added to the image element; or different styles of makeup special effects can be added to the person in the image, such as light makeup, rich and gaudy, etc. Different styles of filters are also set, such as natural, fair, nostalgic, black and white, vintage, etc. The special effect elements are added to the image element to generate the target multimedia resource of the image element. Using the image special effect configuration file in the present disclosure to configure the target multimedia resource and recognize the image element can trigger the target multimedia resource comprising the special effect elements.

In a possible implementation, storing the image element and the target multimedia resource into the special effect configuration file in an association way comprises:

generating an image recognition model based on the image element; the image recognition model being used for recognizing whether the image element appears in the original image; and storing the image recognition model and the target multimedia resource into the special effect configuration file in an association way.

In practical applications, features of the image element are extracted, and the image recognition model is generated based on the features of the image element. The image recognition model corresponds to the image element. The image recognition model and the target multimedia resource are stored into the image special effect configuration file in an association way, which is used for recognizing whether the recognized image element appears in the original image. The image recognition model in the present disclosure is a recognition model determined for several images related to the features of the image element. Different from the prior art that requires a large number of training samples to develop a specific image recognition algorithm for a specific image element, the present disclosure determines the image recognition model based on a user-defined image element, and configures the target multimedia resource corresponding to the image element of the original image, which is more flexible in use.

In the image special effect configuration method provided by an embodiment of the present disclosure, the image element is acquired; the target multimedia resource corresponding to the image element is acquired in response to the special effect configuration operation for the image element; the image element and the target multimedia resource are stored into the special effect configuration file in an association way, the special effect configuration file being used for performing the special effect configuration on the original image, so that the target multimedia resource is played when the image element appears in the original image. In the present disclosure, a user can customize the image element, and sets the corresponding target multimedia resource. The corresponding target multimedia resource is played when the image element is recognized, so that the special effect configuration of the image is more flexible.

The image special effect configuration file in the present disclosure can configure the corresponding target multimedia resource for the image element of the original image. After the user recognizes the image element in the original image through the terminal device, the pre-configured target multimedia resource is played. For details of the process from recognizing the image to triggering the play of the multimedia resource, see the following embodiment.

Figure 2:
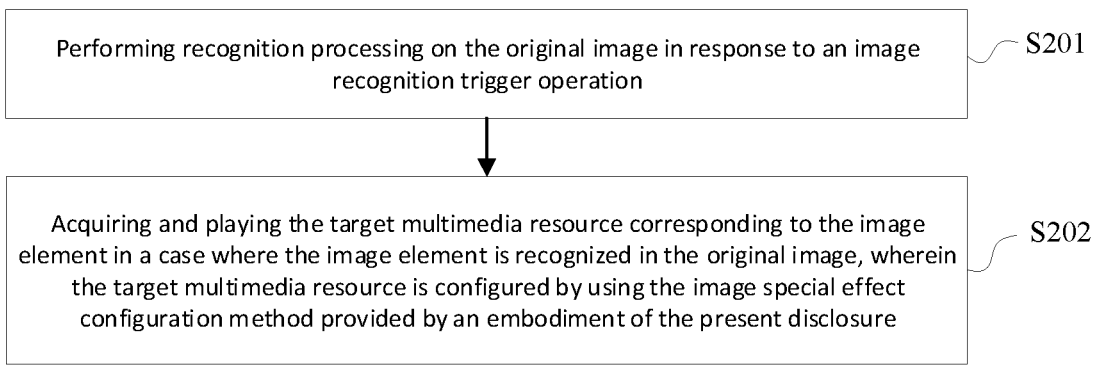
FIG. 2 is a flowchart of an image recognition method provided by an embodiment of the present disclosure.

FIG. 2 is a flowchart of an image recognition method provided by an embodiment of the present disclosure; as shown in FIG. 2, the method may comprise:

Step S201: performing recognition processing on the original image in response to an image recognition trigger operation.

The image recognition trigger operation can be a camera enabling operation that the user enables the camera of the terminal device. After the camera is enabled, an original image within a shooting range of the camera is recognized by using the image recognition model.

Step S202: acquiring and playing the target multimedia resource corresponding to the image element in a case where the image element is recognized in the original image.

The target multimedia resource is configured by using the image special effect configuration method provided by an embodiment of the present disclosure.

When the image recognition model recognizes that the original image comprises the image element, the target multimedia resource corresponding to the image element is acquired from the special effect configuration file, and the target multimedia resource is played based on the play information corresponding to the target multimedia resource.

From recognizing the image element to triggering the play of the target multimedia resource, it can be completed in a rendering linked list. The image element and the associated target multimedia resource are used as all nodes of the rendering linked list, which are rendered and shown in order.

In the image recognition method provided by the embodiment of the present disclosure, the recognition processing is performed on the original image in response to the image recognition trigger operation; the target multimedia resource corresponding to the image element is acquired and played when the image element is recognized in the original image, the target multimedia resource being configured by using the image special effect configuration method provided by the embodiment of the present disclosure. In the embodiment of the present disclosure, the play of the corresponding target multimedia resource can be triggered by performing recognition processing on the image element of the original image, which is simple to operate and convenient to use.

For example, in some examples, the image recognition trigger operation above is executed by the user.

Figure 3:
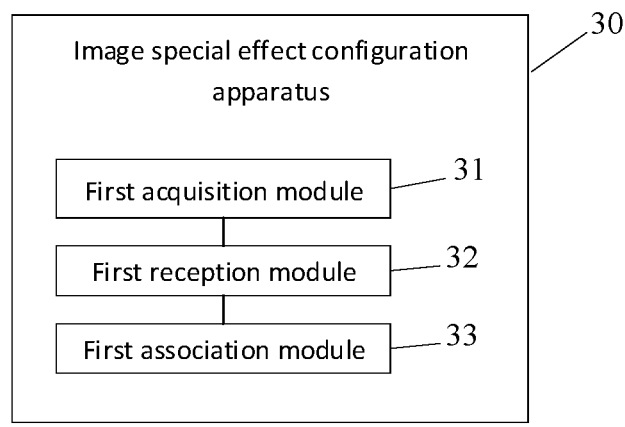
FIG. 3 is a structural diagram of an image special effect configuration apparatus provided by an embodiment of the present disclosure.

Based on the same principle as that of the method shown in FIG. 1, an embodiment of the present disclosure further provides an image special effect configuration apparatus 30, as shown in FIG. 3, the image special effect configuration apparatus 30 may comprise:

a first acquisition module 31, which is configured to acquire an image element;

a first reception module 32, which is configured to acquire a target multimedia resource corresponding to the image element in response to a special effect configuration operation for the image element; and a first association module 33, which is configured to store the image element and the target multimedia resource into the special effect configuration file in an association way.

The special effect configuration file is used for performing the special effect configuration on the original image, so that the target multimedia resource is played when the image element appears in the original image.

In a possible implementation, the first reception module 32 is configured to:

show a multimedia resource list in response to a trigger operation on the multimedia resource list; and take the selected multimedia resource as the target multimedia resource in response to a selection operation for the multimedia resource in the multimedia resource list.

In a possible implementation, the image special effect configuration apparatus 30 further comprises:

a second acquisition module, which is configured to acquire a display region of an image element;

a first determination module, which is configured to determine a display region of a target multimedia resource based on the display region of the image element; and a second association module, which is configured to store the display region of the target multimedia resource and the target multimedia resource into a special effect configuration file in an association way.

In a possible implementation, the image special effect configuration apparatus 30 further comprises:

a second determination module, which is configured to determine play information corresponding to the target multimedia resource based on the play setting operation, in response to the play setting operation for the multimedia resource; and a third association module, which is configured to store the play information and the target multimedia resource into the special effect configuration file in an association way.

The play information comprises at least one selected from a group consisting of: loop play, play duration, and play times.

In a possible implementation, when acquiring the target multimedia resource corresponding to the image element, the first reception module 32 is configured to:

generate the target multimedia resource corresponding to the image element based on the image element.

In a possible implementation, when generating the corresponding target multimedia resource based on the image element, the first reception module 32 is configured to:

acquire special effect elements, add the special effect elements to the image element, and generate the target multimedia resource corresponding to the image element.

The special effect elements comprise at least one selected from a group consisting of: text, image, makeup, filter and audio.

In a possible implementation, the first association module 33 is configured to:

generate an image recognition model based on the image element, the image recognition model being used for recognizing whether the image element appears in the original image; and store the image recognition model and the target multimedia resource into the special effect configuration file in an association way.

The image special effect configuration apparatus of an embodiment of the present disclosure can execute the image special effect configuration method provided by an embodiment of the present disclosure, and its implementation principles are similar. Actions executed by each module of the image special effect configuration apparatus in each embodiment of the present disclosure correspond to the steps in the image special effect configuration method in each embodiment of the present disclosure. For the detailed functional description of each module of the image special effect configuration apparatus, see the description in the corresponding image special effect configuration method shown above, which will not be repeated here.

In the image special effect configuration apparatus provided by an embodiment of the present disclosure, the image element is acquired; the target multimedia resource corresponding to the image element is acquired in response to the special effect configuration operation for the image element; the image element and the target multimedia resource are stored into the special effect configuration file in an association way, the special effect configuration file being used for performing the special effect configuration on the original image, so that the target multimedia resource is played in a case where the image element appears in the original image. In the present disclosure, the user can customize the image element, and sets the corresponding target multimedia resource. The corresponding target multimedia resource is played when the image element is recognized, so that the special effect configuration of the image is more flexible.

Figure 4:
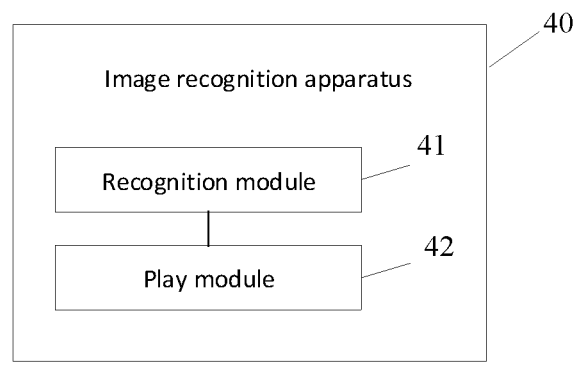
FIG. 4 is a structural diagram of an image recognition apparatus provided by an embodiment of the present disclosure.

Based on a same principle as that of the method shown in FIG. 2, an embodiment of the present disclosure further provides an image special effect recognition apparatus 40, as shown in FIG. 4, the image special effect recognition apparatus 40 may comprise:

a recognition module 41, which is configured to perform recognition processing on the original image in response to an image recognition trigger operation; and a play module 42, which is configured to acquire and play the target multimedia resource corresponding to the image element when the image element is recognized in the original image.

The target multimedia resource is configured by using the image special effect configuration method provided by an embodiment of the present disclosure.

The image recognition apparatus of an embodiment of the present disclosure can execute the image recognition method provided by an embodiment of the present disclosure, and its implementation principles are similar. Actions executed by each module of the image recognition apparatus in each embodiment of the present disclosure correspond to the steps in the image recognition method in each embodiment of the present disclosure. For the detailed functional description of each module of the image recognition apparatus, see the description in the corresponding image recognition method shown above, which will not be repeated here.

In the image recognition apparatus provided by an embodiment of the present disclosure, the play of the corresponding target multimedia resource can be triggered by performing recognition processing on the image element of the original image, which is simple to operate and convenient to use.

Figure 5:
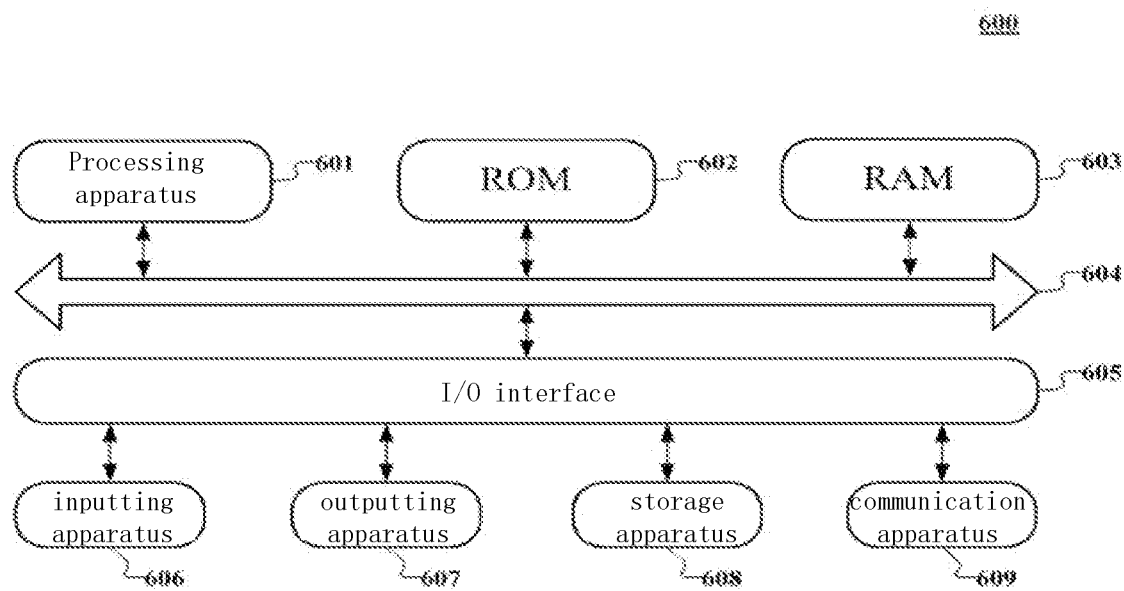
FIG. 5 is a structural diagram of an electronic device provided by an embodiment of the present disclosure.

Referring to FIG. 5 below, a structural diagram of an electronic device 600 suitable for implementing an embodiment of the present disclosure is shown. The execution subject of the technical solution of the embodiments of the present disclosure may comprise, but not limited to, mobile terminals such as mobile phones, laptops, digital broadcast receivers, PDAs (Personal Digital Assistant), PADs (Portable Android Device), PMPs (Portable Multimedia Player), vehicle terminals (such as a vehicle navigation terminal), and fixed terminals such as digital TVs, desktop computers and the like. The electronic device shown in FIG. 5 is only an example, and there should be no restrictions on the function and scope of use of the embodiments of the present disclosure.

The electronic device comprises a memory and a processor, wherein the processor herein can be called a processing apparatus 601 below, and the memory may comprise at least one of a read-only memory (ROM) 602, a random-access memory (RAM) 603, and a storage apparatus 608 below, which is specifically shown below:

As shown in FIG. 5, the electronic device 600 may comprise the processing apparatus (such as a central processor, a graphics processor, etc.) 601, which may execute various appropriate actions and processes according to programs stored in the read-only memory (ROM) 602 or programs loaded into the random access memory (RAM) 603 from the storage apparatus 608. In the RAM 603, various programs and data required for operations of the electronic device 600 are also stored. The processing apparatus 601, the ROM 602, and the RAM 603 are connected to each other by a bus 604. An input/output (I/O) interface 605 is also connected to the bus 604.

Generally, the following apparatuses can be connected to the I/O interface 605: an inputting apparatus 606 comprising, for example, a touch screen, a touch pad, a keyboard, a mouse, a camera, a microphone, an accelerometer, a gyroscope and the like; an outputting apparatus 607 comprising, for example, a liquid crystal display (LCD), a loudspeaker, a vibrator and the like; a storage apparatus 608 comprising, for example, a tape, a hard disk and the like; and a communication apparatus 609. The communication apparatus 609 may allow the electronic device 600 to perform wireless or wired communication with other devices to exchange data. Although FIG. 5 shows the electronic device 600 having various apparatuses, it should be understood that it is not required to implement or have all the apparatuses shown. More or fewer apparatuses may alternatively be implemented or provided.

In particular, according to an embodiment of the present disclosure, a process described above with reference to the flowchart can be implemented as a computer software program. For example, an embodiment of the present disclosure comprises a computer program product, which comprises a computer program carried on a non-transient computer-readable medium, and the computer program comprises program code for executing the method shown in a flowchart. In such an embodiment, the computer program can be downloaded and installed from a network through the communication apparatus 609, or installed from the storage apparatus 608, or installed from the ROM 602. When the computer program is executed by the processing apparatus 601, the above functions defined in the method of the embodiment of the present disclosure are executed.

It should be noted that the above computer-readable medium of the present disclosure may be a computer-readable signal medium, a computer-readable storage medium, or any combination of the two. The computer-readable storage medium may be, for example, but not limited to, an electrical, magnetic, optical, electromagnetic, infrared, or semiconductor system, apparatus, or device, or any combination thereof. More specific examples of the computer-readable storage medium may comprise, but not limited to: an electrical connection with one or more lead wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device or any suitable combination thereof In the present disclosure, the computer-readable storage medium may be any tangible medium comprising or storing a program, the program may be used by or in combination with a command execution system, apparatus or device. In the present disclosure, the computer-readable signal medium may comprise a data signal propagated in a baseband or as part of a carrier, in which computer-readable program code is carried. Such a propagated data signal may take various forms, comprising but not limited to an electromagnetic signal, an optical signal or any suitable combination thereof. The computer-readable signal medium may also be any computer-readable medium other than the computer-readable storage medium. The computer-readable signal medium may send, propagate, or transmit the program used by or in combination with the command execution system, apparatus or device. The program code comprised in the computer-readable medium can be transmitted with any appropriate medium, comprising but not limited to: a wire, an optical cable, RF (radio frequency), etc., or any appropriate combination thereof.

In some implementations, clients and servers can communicate by using any currently known or future developed network protocol, such as HTTP (HyperText Transfer Protocol), and can be interconnected with digital data communication (for example, a communication network) of any form or medium. Examples of the communication network comprise a local area network ("LAN"), a wide area network ("WAN"), the Internet work (for example, the Internet), and an end-to-end network (for example, an ad hoc end-to-end network), as well as any currently known or future developed network.

The computer-readable medium may be comprised in the electronic device, or can stand alone without being assembled into the electronic device.

The computer-readable medium carries one or more programs. When the one or more programs are executed by the electronic device, the electronic device is made to: acquire an image element; acquire the target multimedia resource corresponding to the image element in response to the special effect configuration operation for the image element; store the image element and the target multimedia resource into the special effect configuration file in an association way, the special effect configuration file being used for performing the special effect configuration on the original image, so that the target multimedia resource is played in a case where the image element appears in the original image. Alternatively, the recognition processing is performed on the original image in response to the image recognition trigger operation; the target multimedia resource corresponding to the image element is acquired and played in a case that the image element is recognized in the original image, the target multimedia resource being configured by using the image special effect configuration method provided by the embodiment of the present disclosure.

The computer program code for executing the operations of the present disclosure may be written in one or more programming languages or a combination thereof. The programming languages comprise, but not limited to, object-oriented programming languages such as Java, Smalltalk, C++, and further comprise conventional procedural programming languages such as "C" language or similar programming languages. The program code can be executed completely on a user computer, partially on the user computer, as an independent software package, partially on the user computer and partially on a remote computer, or completely on the remote computer or server. In a case involving the remote computer, the remote computer may be connected to the user computer through any type of networks, comprising the local area network (LAN) or wide area network (WAN), or may be connected to an external computer (for example, connected via the Internet by using an Internet service provider).

The flowcharts and block diagrams in the accompanying drawings illustrate possible architectures, functions and operations of the system, method and computer program product according to various embodiments of the present disclosure. In this regard, each block in the flowchart or block diagram may represent a module, program segment, or part of code, and the module, program segment, or part of code comprise one or more executable instructions used for implementing a specified logic function. It should also be noted that in some alternative implementations, functions marked in the block may also occur in a different order from those marked in the accompanying drawings. For example, two consecutively represented blocks can actually be executed basically in parallel, or can sometimes be executed in a reverse order, which depends on the function involved. It should also be noted that each block in the block diagram and/or flow diagram, and a combination of the blocks in the block diagram and/or flow diagram, can be implemented with a dedicated hardware-based system that performs the specified function or operation, or can be implemented with a combination of dedicated hardware and computer instructions.

The involved module or unit described in the embodiments of the present disclosure can be implemented by software or hardware. Wherein, the name of the module or unit does not constitute restriction on the unit itself in some cases.

The functions described above herein may be executed at least partially by one or more hardware logic components. For example, without limitation, exemplary types of the hardware logic components that can be used comprise: a field programmable gate array (FPGA), an application-specific integrated circuit (ASIC), an application-specific standard product (ASSP), a system on chip (SOC), a complex programmable logic device (CPLD), and so on.

In the context of the present disclosure, a machine-readable medium may be a tangible medium, which may comprise or store a program used by or in combination with an command execution system, apparatus or device. The machine-readable medium may be a machine-readable signal medium or a machine-readable storage medium. The machine-readable medium may comprise, but not limited to, an electronic, magnetic, optical, electromagnetic, infrared, or semiconductor system, apparatus, or device, or any suitable combination thereof. A more specific example of the machine-readable storage medium would comprise an electrical connection based on one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

According to one or more embodiments of the present disclosure, the present disclosure provides an image special effect configuration method, which comprises:

acquiring an image element;

acquiring a target multimedia resource corresponding to the image element in response to a special effect configuration operation for the image element; and storing the image element and the target multimedia resource into a special effect configuration file in an association way.

The special effect configuration file is used for performing special effect configuration on an original image, so that the target multimedia resource is played in a case where the image element appears in the original image.

In an possible implementation, acquiring the target multimedia resource corresponding to the image element comprises:

showing a multimedia resource list in response to a trigger operation on the multimedia resource list; and taking a selected multimedia resource as the target multimedia resource in response to a selection operation for a multimedia resource in the multimedia resource list.

In an possible implementation, the method further comprises:

acquiring a display region of the image element;

determining a display region of the target multimedia resource based on the display region of the image element; and storing the display region of the target multimedia resource and the target multimedia resource into the special effect configuration file in an association way.

In a possible implementation, the method further comprises:

in response to a play setting operation for the multimedia resource, determining play information corresponding to the target multimedia resource based on the play setting operation; and storing the play information and the target multimedia resource into the special effect configuration file in an association way, The play information comprises at least one selected from a group consisting of: loop play, play duration, and play times.

In a possible implementation, acquiring the target multimedia resource corresponding to the image element comprises:

generating the target multimedia resource based on the image element.

In a possible implementation, generating the target multimedia resource based on the image element comprises:

acquiring a special effect element, adding the special effect element to the image element, and generating the target multimedia resource, The special effect element comprises at least one selected from a group consisting of: text, image, beauty, filter, and audio.

In a possible implementation, storing the image element and the target multimedia resource into the special effect configuration file in an association way comprises:

generating an image recognition model based on the image element, the image recognition model being used for recognizing whether the image element appears in the original image; and storing the image recognition model and the target multimedia resource into the special effect configuration file in an association way.

According to one or more embodiments of the present disclosure, the present disclosure provides an image recognition method, which comprises:

performing recognition processing on an original image in response to an image recognition trigger operation; and acquiring and playing a target multimedia resource corresponding to an image element in a case where the image element is recognized in the original image.

The target multimedia resource is configured by using the image special effect configuration method provided by the embodiment of the present disclosure.

According to one or more embodiments of the present disclosure, the present disclosure provides an image special effect configuration apparatus, which comprises:

a first acquisition module, configured to acquire an image element;

a first reception module, configured to acquire a target multimedia resource corresponding to the image element in response to a special effect configuration operation for the image element; and a first association module, configured to store the image element and the target multimedia resource into a special effect configuration file in an association way.

The special effect configuration file is used for performing special effect configuration on an original image, so that the target multimedia resource is played in a case where the image element appears in the original image.

In a possible implementation, the first reception module is configured to:

show a multimedia resource list in response to a trigger operation on the multimedia resource list; and take the selected multimedia resource as the target multimedia resource in response to a selection operation for the multimedia resource in the multimedia resource list.

In a possible implementation, the image special effect configuration apparatus further comprises:

a second acquisition module, configured to acquire a display region of an image element;

a first determination module, configured to determine a display region of a target multimedia resource based on the display region of the image element; and a second association module, configured to store the display region of the target multimedia resource and the target multimedia resource into a special effect configuration file in an association way.

In a possible implementation, the image special effect configuration apparatus further comprises:

a second determination module, configured to in response to a play setting operation for the multimedia resource, determine play information corresponding to the target multimedia resource based on the play setting operation; and a third association module, configured to store the play information and the target multimedia resource into the special effect configuration file in an association way.

The play information comprises at least one selected from a group consisting of: loop play, play duration, and play times.

In a possible implementation, when acquiring the target multimedia resource corresponding to the image element, the first reception module is configured to: generate the target multimedia resource of the image element based on the image element.

In a possible implementation, when generating the target multimedia resource corresponding to the image based on the image element, the first reception module is configured to: acquire special effect elements, add the special effect elements to the image element, and generate the target multimedia resource of the image element.

The special effect elements comprise at least one selected from a group consisting of: text, image, makeup, filter and audio.

In a possible implementation, the first association module is configured to:

generate an image recognition model based on the image element, the image recognition model being used for recognizing whether the image element appears in the original image; and store the image recognition model and the target multimedia resource into the special effect configuration file.

According to one or more embodiments of the present disclosure, the present disclosure provides an image recognition apparatus, which comprises:

a recognition module, configured to perform recognition processing on an original image in response to an image recognition trigger operation; and a play module, configured to acquire and play a target multimedia resource corresponding to an image element in a case where the image element is recognized in the original image.

The target multimedia resource is configured by using the image special effect configuration method provided by the embodiment of the present disclosure.

In some examples of the present disclosure, operations such as the special effect configuration operation for the image element, the trigger operation for the multimedia resource list, the selection operation for the multimedia resource in the multimedia resource list, and the play setting operation for the multimedia resource can all be performed by the user.

According to one or more embodiments of the present disclosure, the present disclosure provides an electronic device, which comprises:

one or more processors;
a memory;
one or more computer programs, wherein the one or more computer programs are stored in the memory and configured to be executed by the one or more processors, and the one or more computer programs are configured to perform the image special effect configuration method or the image recognition method provided by the embodiment of the present disclosure.

According to one or more embodiments of the present disclosure, the present disclosure provides a computer-readable medium. The computer-readable medium is used for storing computer instructions that, when executed on a computer, causes the computer to execute the image special effect configuration method or the image recognition method provided by the embodiment of the present disclosure.

The above description is only a preferred embodiment of the present disclosure and an illustration of the applied technical principles. Those skilled in the art should understand that the disclosure scope involved in the present disclosure is not limited to the technical solutions formed by the specific combination of the above technical features, but also should encompass other technical solutions formed by the arbitrary combination of the above technical features or their equivalent features without departing from the above disclosure concept. For example, a technical solution that is formed by the above features and the technical features disclosed in the present disclosure (but not limited to) with similar functions replacing each other.

Furthermore, although various operations are described in a particular order, it should not be understood as requiring the operations to be performed in a particular order shown or in a sequential order. Under certain circumstances, multitasking and parallel processing may be advantageous. Similarly, although the above discussion comprises several specific implementation details, these should not be interpreted as limiting the scope of the present disclosure. Certain features described in the context of separate embodiments may also be implemented in combination in a single embodiment. Conversely, various features described in the context of the single embodiment may also be implemented in multiple embodiments individually or in any suitable sub combination.

Although the subject matter has been described in language specific to the structural features and/or method logic actions, it should be understood that the subject matter defined in the appended claims is not necessarily limited to the specific features or actions described above. Conversely, the specific features and actions described above are only example forms of implementing the claims.

What is claimed is:

1. An image special effect configuration method, comprising:
   acquiring an image element;
   acquiring a target multimedia resource corresponding to the image element in response to a special effect configuration operation for the image element;
   storing the image element and the target multimedia resource into a special effect configuration file in an association way;
   acquiring a display region of the image element;
   determining a display region of the target multimedia resource based on the display region of the image element; and
   storing the display region of the target multimedia resource and the target multimedia resource into the special effect configuration file in the association way,
   wherein the special effect configuration file is used for performing special effect configuration on an original image, so that the target multimedia resource is played in a case where the image element appears in the original image.

2. The method according to claim 1, wherein acquiring the target multimedia resource corresponding to the image element comprises:
   showing a multimedia resource list in response to a trigger operation on the multimedia resource list; and
   taking a selected multimedia resource as the target multimedia resource in response to a selection operation for a multimedia resource in the multimedia resource list.

3. The method according to claim 2, further comprising:
   acquiring a display region of the image element;
   determining a display region of the target multimedia resource based on the display region of the image element; and
   storing the display region of the target multimedia resource and the target multimedia resource into the special effect configuration file in the association way.

4. The method according to claim 2, further comprising:
   in response to a play setting operation for the multimedia resource, determining play information corresponding to the target multimedia resource based on the play setting operation; and
   storing the play information and the target multimedia resource into the special effect configuration file in the association way,
   wherein the play information comprises at least one selected from a group consisting of: loop play, play duration, and play times.

5. The method according to claim 2, wherein storing the image element and the target multimedia resource into the special effect configuration file in the association way comprises:
   generating an image recognition model based on the image element, the image recognition model being used for recognizing whether the image element appears in the original image; and
   storing the image recognition model and the target multimedia resource into the special effect configuration file in the association way.

6. The method according to claim 1, further comprising:
   in response to a play setting operation for the target multimedia resource, determining play information corresponding to the target multimedia resource based on the play setting operation; and
   storing the play information and the target multimedia resource into the special effect configuration file in the association way,
   wherein the play information comprises at least one selected from a group consisting of: loop play, play duration, and play times.

7. The method according to claim 6, wherein storing the image element and the target multimedia resource into the special effect configuration file in the association way comprises:
   generating an image recognition model based on the image element, the image recognition model being used for recognizing whether the image element appears in the original image; and
   storing the image recognition model and the target multimedia resource into the special effect configuration file in the association way.

8. The method according to claim 1, wherein acquiring the target multimedia resource corresponding to the image element comprises:
   generating the target multimedia resource based on the image element.

9. The method according to claim 8, wherein generating the target multimedia resource based on the image element comprises:
   acquiring a special effect element, adding the special effect element to the image element, and generating the target multimedia resource, wherein the special effect element comprises at least one selected from a group consisting of: text, image, beauty, filter, and audio.

10. The method according to claim 9, wherein storing the image element and the target multimedia resource into the special effect configuration file in the association way comprises:
generating an image recognition model based on the image element, the image recognition model being used for recognizing whether the image element appears in the original image; and
storing the image recognition model and the target multimedia resource into the special effect configuration file in the association way.

11. The method according to claim 8, wherein storing the image element and the target multimedia resource into the special effect configuration file in the association way comprises:
generating an image recognition model based on the image element, the image recognition model being used for recognizing whether the image element appears in the original image; and
storing the image recognition model and the target multimedia resource into the special effect configuration file in the association way.

12. The method according to claim 1, wherein storing the image element and the target multimedia resource into the special effect configuration file in the association way comprises:
generating an image recognition model based on the image element, the image recognition model being used for recognizing whether the image element appears in the original image; and
storing the image recognition model and the target multimedia resource into the special effect configuration file in the association way.

13. An image recognition method, comprising:
performing recognition processing on an original image in response to an image recognition trigger operation; and
acquiring and playing a target multimedia resource corresponding to an image element in a case where the image element is recognized in the original image,
wherein the target multimedia resource is configured by using the image special effect configuration method according to claim 1.

14. An image recognition apparatus, comprising:
a recognition module, configured to perform recognition processing on an original image in response to an image recognition trigger operation; and
a play module, configured to acquire and play a target multimedia resource corresponding to an image element in a case where the image element is recognized in the original image,
wherein the target multimedia resource is configured by using the image special effect configuration method according to claim 1.

15. An electronic device, comprising:
one or more processors;
a memory; and
one or more computer programs, wherein the one or more computer programs are stored in the memory and configured to be executed by the one or more processors, and the one or more computer programs are configured to perform the image special effect configuration method according to claim 1.

16. A computer-readable medium, wherein the computer-readable medium is used for storing computer instructions that, when executed on a computer, causes the computer to execute the image special effect configuration method according to claim 1.

17. An image special effect configuration apparatus, comprising:
a first acquisition module, configured to acquire an image element;
a first reception module, configured to acquire a target multimedia resource corresponding to the image element in response to a special effect configuration operation for the image element;
a first association module, configured to store the image element and the target multimedia resource into a special effect configuration file in an association way;
a second acquisition module, configured to acquire a display region of the image element;
a first determination module, configured to determine a display region of the target multimedia resource based on the display region of the image element; and
a second association module, configured to store the display region of the target multimedia resource and the target multimedia resource into the special effect configuration file in the association way,
wherein the special effect configuration file is used for performing special effect configuration on an original image, so that the target multimedia resource is played in a case where the image element appears in the original image.

* * * * *